Figure 1:
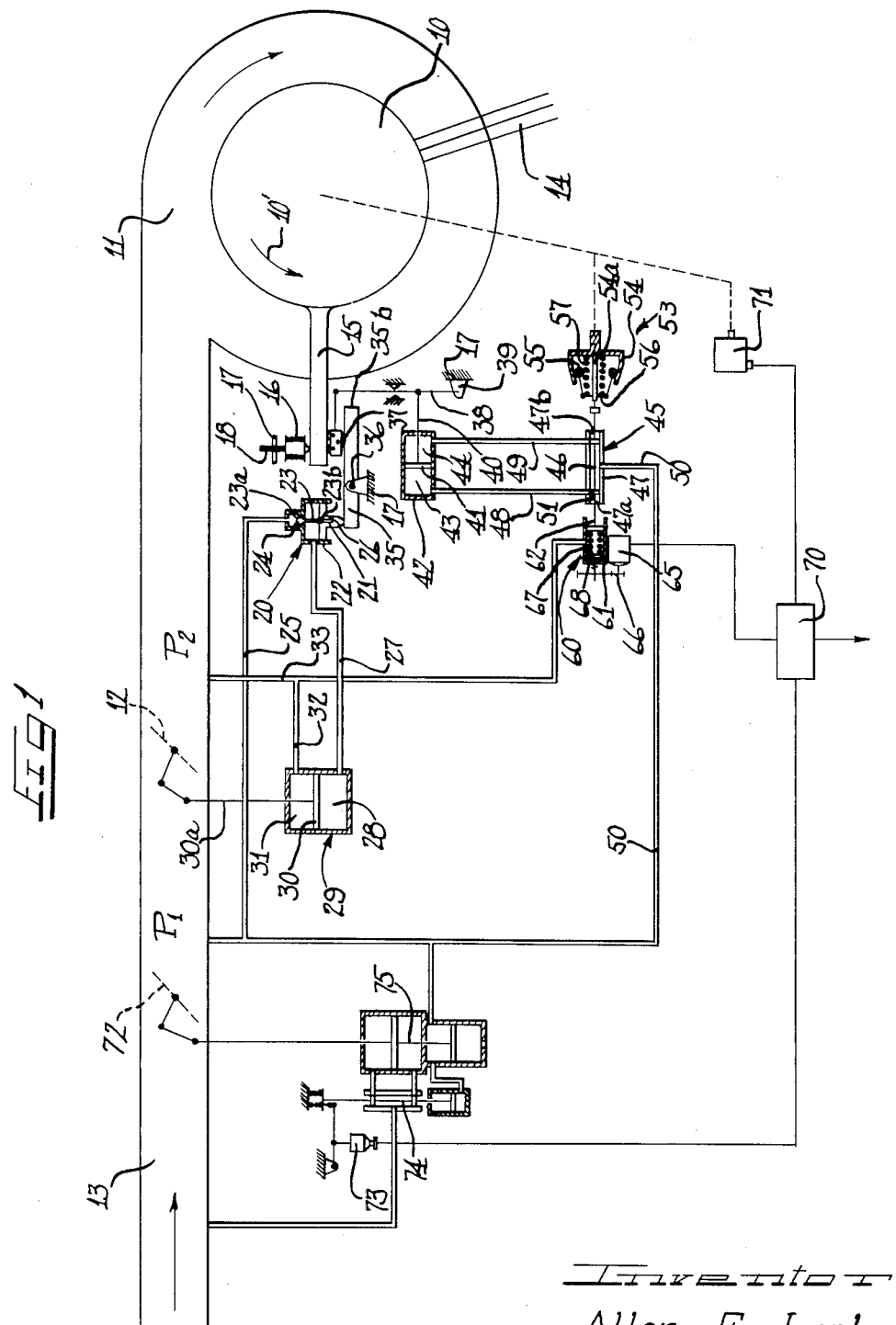

July 3, 1956

A. E. LEPLEY 2,753,465

ALTERNATOR CONTROL SYSTEM

Filed July 27, 1954

2 Sheets-Sheet 1

Inventor
Allen E. Lepley

Inventor
Allen E. Lepley

United States Patent Office 2,753,465
Patented July 3, 1956

2,753,465

ALTERNATOR CONTROL SYSTEM

Allen Edwin Lepley, Wickliffe, Ohio, assignor to Thompson Products, Inc., Cleveland, Ohio, a corporation of Ohio Application July 27, 1954, Serial No. 446,030

15 Claims. (Cl. 290—4)

The present invention relates to control systems for use with turbine driven alternators, and, more particularly, relates to a novel combined torque and speed responsive system for controlling of the throttle of a gas driven turbine which is in turn drivingly associated with an alternator forming the part of a multiple alternator power supply system.

With the advent of larger and much more complex aircraft with larger control surfaces and other similar electrically actuated devices the need for large quantities of electrical energy on such aircraft has greatly increased. Since the electrical source must be carried on the aircraft, weight and size are at a premium. Since efficiency is thus at a premium it has been considered most practicable to utilize a plurality of relatively small alternators for supplying the electrical system of large, modern airplanes. These alternators are preferably located adjacent the separate jet engines of the airplane and are driven by means of air turbines operating on compressed air bled from the compressors of the aircraft's jet engines by means forming no part of the present invention.

The use of a plurality of alternators has posed several serious problems of control. As is well known, alternators connected in parallel relationship with each other will tend automatically to remain locked in synchronism with each other once their speeds are synchronized, thereby causing them to rotate at substantially identical speeds. However, this synchronism, while it will tend to force all of the alternators to operate at the same speed, will not require the individual alternators to carry their own proportionate shares of the electrical load. Thus, an alternator may in some cases accept the electrical load to an extent wherein it operates as a generator driving the remaining alternators as synchronous motors. When this latter situation occurs, the alternator which has accepted the load will, of course, become greatly overloaded, and if the condition continues, will usually become overheated and burn out.

It has therefore been found necessary to construct a control system capable of governing the speed of the individual alternators while simultaneously governing the torque output of the individual alternator turbines whereby the load on the individual alternator will be maintained substantially at its proportionate share.

The control system of the present invention is constructed to provide the necessary control through the actuation of the individual turbine throttle in response to alternator load conditions as well as alternator speed. The controls are arranged such that upon an increase in speed the turbine inlet throttle will be closed to counteract the forces tending to cause the increase, and likewise, upon an increase in electrical load on the alternator individually, irrespective of the speed thereof, the throttle will be opened to a position that will cause the turbine to continue to operate at substantially the same, but slightly lower, speed than before. Likewise, decreases in speed will cause an increasing degree of throttle opening and decreases in load will cause the throttle to close somewhat to maintain the alternator speed substantially the same as, but slightly higher than, before.

The proper interrelationship of each individual alternator into the alternator system is accomplished through the provision of a scheduled speed "droop" characteristic which causes the individual alternators to operate at a different speed for each load. The control system is constructed to provide each alternator with substantially the same scheduled "droop" characteristic and as a result a proper division of the load is achieved.

While various means have been advanced for the accurate control of the alternator speed and load characteristics, the present invention contemplates the utilization of a prony brake or similar mechanical torque sensing apparatus associated with the individual alternators and which will operate in conjunction with the speed "droop" characteristic control to operate the individual turbine throttles. Rapid fluctuations in the alternator load will immediately be sensed and will operate the throttle to counteract the change sensed by the torque device and thus properly maintain the desired load even though the alternator is operating in synchronism with, and hence at a speed determined by, other alternators.

It is therefore an object of the present invention to provide a simplified automatic load division and speed control for an alternator system.

Another object of the present invention is to provide an alternator control system incorporating a scheduled "droop" load division control in combination with an alternator speed and torque control.

A further object of the present invention is to provide a novel combined load division control for alternators, which control utilizes individual alternator torque, individual alternator turbine inlet pressure and alternator speed as the controlling variables.

Yet another object of the present invention is to provide a mechanical-pneumatic control for gas turbines and capable of providing a substantially linear "droop" characteristic of the speed versus load curve.

Still a further object of the present invention is to provide a mechanical-pneumatic control for the throttle of a gas driven turbine, which control will provide actuation of the turbine throttle to control the energy supplied to the alternator turbine to balance the output power desired.

A feature of the present invention is a pneumatic control actuable in response to movement of a pneumatic pilot valve, which valve is sensitive to variations in alternator torque as well as fluctuations in alternator speed.

Another feature of the present invention is the provision of a control valve for the throttle actuator of an alternator which control valve is actuable directly in response to torque variations produced in the alternator and indirectly in response to variations in speed and load of the entire alternator system.

A further feature of the present invention is the provision of a turbine speed and load control for use in a combination with a plurality of similar turbines for driving a plurality of similar alternators, whereby the individual turbines may be controlled in substantial accordance with the average load imposed upon the entire group of turbines irrespective of the speed of operation of the group.

Another object of the present invention is to provide a turbine control having a rapid response to fluctuations in the actual output torque of an individual turbine to apply a correcting, opposing influence on the turbine throttle while simultaneously providing an average, less sensitive, variation in the throttle actuator of the turbine to cause the turbine to act at a predetermined speed in response to a variation in its assumed load or torque, whereby a slight increase in speed will occur upon a load decrease and vice-versa irrespective of intermittent fluctuations in turbine load.

Still other objects and features of the present invention will become apparent immediately to those skilled in the art from a consideration of the attached drawing in which a preferred embodiment of the present invention is shown by way of illustration only.

Figure 2:
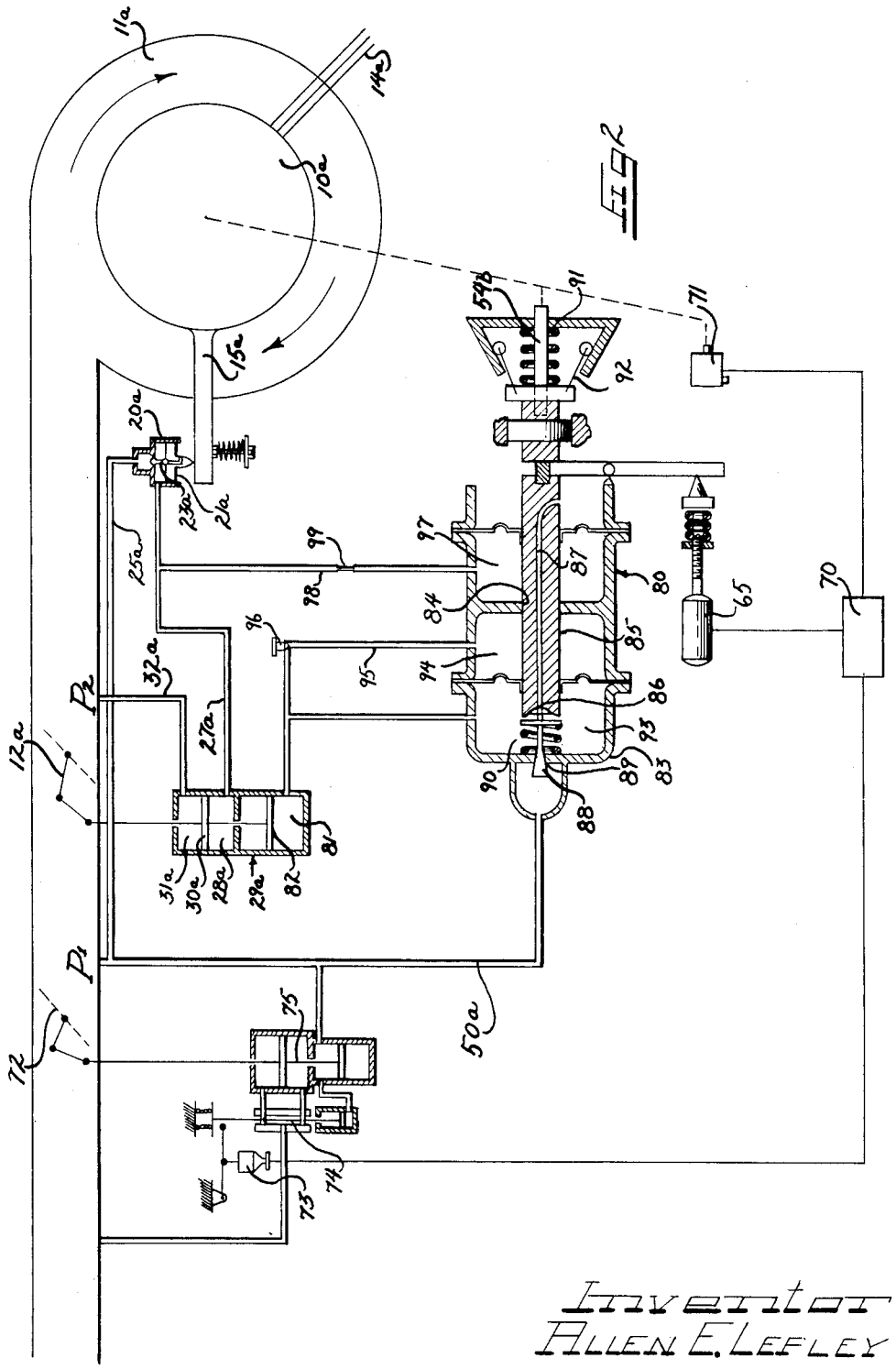

On the drawings:

Figure 1 is a diagrammatic view of a turbine driven alternator control incorporating the features of the present invention; and Figure 2 is a diagrammatic view of a modified form of the invention.

As shown on the drawings:

The control system of the present invention is intended for use with a system of alternators arranged in parallel, although, of course, it is to be understood that various types of interrelated loads may be controlled by the apparatus of the present invention if desired. As mentioned above, present aircraft installations have increased the need for electrical energy aboard a plane to an extent that it is no longer feasible to utilize a single alternator. Thus, it is now contemplated that several individual alternators be utilized and electrically connected in parallel to each other and to the electrical load.

The electrical connections between the alternators, of course, do not constitute a part of this invention and since the characteristics of a plurality of alternators running in parallelism are well known, the drawings of the present invention illustrate only a single individual alternator 10. It is however, understood that in the actual controlled system a plurality of alternators 10 will be simultaneously operated and each of the alternators will be provided with a control system similar to that shown in the drawing and hereinafter described.

The alternator 10 is driven by means of a turbine generally indicated at 11 rotating in a clockwise direction as viewed in the drawing. The turbine is operated, as above noted, by air under pressure introduced through the throttle 12 from a line 13. Each of the alternators supplies electric current through the conductors 14 to an electric circuit comprised of several other similar alternators connected in parallel to an electric circuit having an electrical load imposed thereon.

In the form of the present invention shown in Figure 1 a torque indicating lever arm 15 is provided. The arm 15 is preferably mechanically connected to a portion of the alternator housing by planetary gearing of conventional design (not shown) which will transmit a force directly proportional to the load on the alternator 10 but in the direction of the arrow 10' to the lever 15. This force or torque is applied through the lever 15 to a reaction member which will maintain the lever 15 in a substantially non-rotated position. In the present instance, this reaction member comprises a lever 35 pivotally secured at 36 to a fixed housing 17.

Thus, the actual angular position of the lever 15 relative to the fixed housing 17 will be governed by the position of the lever 35, as governed by the torque applied by the arm 15 against the lever 35 in the direction of arrow 10a as a result of the torque of the alternator.

By maintaining the lever 15 in substantially a fixed position, electrical energy is produced by the alternator and the extent of that energy is reflected in the force applied to lever 35 at its right end 35b.

The counterclockwise movement of the lever 15 is opposed by a control valve 20. As may be seen from the figure, the control valve 20 comprises a piston 21 reciprocably mounted within a cylinder 22. A dual check valve 23 is provided having a valve portion 23a within an inlet aperture 24 conducting line pressure from the conduit 25 to the cylinder 22 and is also provided with a ball 23b for cooperation with the opening of a conduit 26 through the piston 21. The length of the valve 23 is such that upon the movement of the piston 21 upwardly it will intercept the end 23b of the valve 23 and force the upper end 23a thereof out of flow restricting contact with the aperture 24. This will permit gas under pressure to pass from the conduit 25 to the conduit 27 and thence to the lower chamber 28 of the actuator generally indicated at 29. However, upon downward movement of the piston 21, the valve 23 drops downwardly closing off the aperture 24 and causing separation between the end 23b and the conduit 26. This separation permits venting of the cylinder 22, and hence the conduit 27 and the chamber 28, to atmosphere through the conduit 26.

It will thus be seen that the piston 21 will be urged downwardly by the pressure in chamber 22 as long as the valve 23b is closed, and that this downward force will act to balance the force applied to lever 35 by lever 15. The lever 15 is urged into constant engagement with lever 35 by spring 16 adjustably mounted by the screw 18 to the fixed housing 17. The spring 16 will prevent a rapid decrease in the alternator load from completely venting chamber 22 to close the throttle off entirely and will thus prevent excessive throttle fluctuation.

The main actuator 29 is provided with a piston 30 operatively connected by a conventional linkage mechanism 30a to the throttle plate 12 such that upward movement as viewed in the figure will cause an opening operation of the throttle. The piston divides the actuator 29 into two separate chambers 28 and 31. As discussed above, the chamber 28 is connected through the valve 20 to the line pressure $P_1$ in the turbine supply. On the other hand, the chamber 31 is directly connected through the conduits 32 and 33 to the downstream side of the throttle 12, whereby introducing a somewhat lower pressure $P_2$ to the chamber 30 than that introduced to the chamber 28. The pressure $P_2$ is the turbine inlet pressure and aside from rapid and intermittent fluctuations to be found in this pressure due to the instantaneous load increases, or instantaneous variations in the $P_1$ pressure and position of throttle 12, the pressure $P_2$ downstream of the throttle 12 will substantially reflect the torque load on the alternator and hence on the turbine 11. Since the downstream pressure, or the pressure in chamber 31, is always equal to or less than the upstream pressure found in chamber 28 of the actuator 29, it will be clear that whenever the piston 21 is moved upwardly sufficient to vent the chamber 28 to the upstream pressure, the throttle 12 will open. Likewise, venting of chamber 28 to atmosphere will cause the pressure in chamber 28 to become less than that in the chamber 31 and, hence, the throttle 12 will close.

It will of course be apparent that the pressure within the cylinder 22 acting against the piston 21 will urge the pivoted torque transmitting lever 35 to pivot in the counterclockwise direction around its pivot 36, thus maintaining the piston 21 in contact with the portion 35a of the lever and the opposite end 35b of the lever in contact with the adjustable load distributing pivot member 37 which is positioned between the lever 35 and the torque lever 15.

A consideration of the system as thus far described indicates that the torque lever 15 associated with the alternator 10 will be positioned in a balanced condition in which the force acting on the piston 21 and attempting to rotate the lever 35 in a counterclockwise direction will oppose and balance the reaction torque of lever 15 and the force of spring 16 tending to turn the lever 35 clockwise so as to produce an adjusted steady state in which no movement takes place in the position of the levers 15 and 35 or the piston 21.

With the parts in this balanced position, any increase in load on the alternator 10 will be evidenced by an increase in torque urging the lever 35 in the clockwise direction causing a movement of the piston 21 upwardly to completely open chamber 22 to the pressure $P_1$. Since the pressure $P_1$ is greater than pressure $P_2$, the throttle will open to prevent an overload of the alternator tending to reduce the speed unduly.

On the other hand, when the load on the alternator is suddenly decreased, the piston 21 will be moved downwardly. This downward movement which is caused by the air in the cylinder 22, and which is also aided by the weight of the piston 21 itself, causes a closure of the valve 23a and an opening of the valve 23b, thus tending to vent the chamber 28 to atmosphere and causing a downward movement of the piston 30 with a resultant closure of the throttle 12. This throttle closure is, of course, immediately evidenced in a reduction of the turbine inlet pressure and hence, a reduction in the torque applied to the system by the turbine 11.

It will be apparent that fluctuations in the position of the lever 35 as a result of variations in torque on the alternator 10 will cause variations in the position of the piston 21, and hence fluctuation in the movement of the valve 23. This fluctuation will cause a pressure in the cylinder 22 which will be fluctuating above and below the pressure of the chamber 31 thereby causing a continuous balancing action on the throttle 12. The balancing action will be modified as above described by the alternator load in a manner that will "anticipate" changes in speed resulting from load changes and will prevent the speed variations by regulating the throttle to counteract changes in speed occasioned by abrupt load changes.

A modification of the balance between the pressures applied to the piston 21, the spring pressure 16 and the torque 15, as above described, is accomplished according to the present invention through a further speed and "droop" characteristic control. This control comprises a pilot valve 45 which is responsive to changes in turbine speed, which is responsive to a manual load versus speed curve adjustment and which is, further, subject to changes in the downstream pressure of the turbine 11 to provide a scheduled speed "droop." This modification is achieved through movement of the distributing element 37 radially back and forth relatively to the pivot 36 and the lever 15. This movement is caused through actuation of the element 37 by means of a lever 38 pivoted about a fixed point 39 and secured by means of a link 40 to a piston 41 reciprocably mounted within a double acting cylinder 42. Movement of the piston 41 is accomplished through the introduction of control pressures to the space 43 or the space 44 on opposite sides thereof under the control of the pilot valve 45.

The valve 45 comprises a slidably mounted spool 46 mounted within the outer cylindrical housing 47. The housing 47 is provided with outlet conduits 48 and 49 leading to the chambers 43 and 44 respectively, and is provided with a single inlet positioned centrally thereof as indicated at 50. The spool 46 is provided with a pair of lands 51 and 52 which are positioned, in the neutral position, to close off the conduits 48 and 49 to the pressure introduced through the opening 50 into the housing 47. It will be clear that movement of the core 46 to the right will cause communication between the conduits 49 and 50, hence applying pressure to the chamber 44 and simultaneously venting chamber 43 to atmosphere. Likewise, movement of the core 46 to the left will connect conduits 48 and 50 applying pressure to chamber 43 and venting chamber 44 to atmosphere through the open end of the conduit 47b.

Actuation of the valve core 46 is accomplished through the speed responsive governor 53. This governor comprises an outer cage 54 drivingly associated with the alternator 10 through conventional gearing (not shown). The cage 54 is slidably but rotatably associated with the pivotally mounted flyweights 55 by means of a polygonal shaft 54a drivingly connected to the weight carrier 56 which in turn is axially fixed to but rotatable relative to the spool 46. The platform 56 upon which the flyweights 55 are mounted is biased toward the left by means of the governor spring 57 thus normally causing the core 46 to be shifted to the left until such time as speed of rotation of the alternator reaches a predetermined point at which the spring 57 is compressed and the flyweights 55 cause the core 46 to move to the right. The strength of the spring 57 will of course determine the speed at which the pilot valve 46 will move to the right causing movement of the element 37 to the left to permit the piston 21 to overpower lever 15 and move downwardly closing the throttle 12.

The action of the spring 57 is modified however, to provide a decreasing required speed of rotation at which the throttle will be actuated into a closed position, by means of a scheduled "droop" control. This scheduled "droop" control, indicated at 60, comprises a cylinder 61 having therein an extension 62 rigidly secured to the valve core 46. The downstream pressure $P_2$ from the turbine inlet is fed into the cylinder 61 through an extension on the conduit 33 and acts to urge the piston 62, and hence the valve core 46, in the same direction as an increase in speed. Therefore, as the pressure $P_2$ at the turbine inlet increases, the spring 57 will partially be overcome and hence the force that must be supplied to cause the flyways 55 outwardly to compress the spring 57 and hence to move the core 46 toward the right will be diminished. Thus, with an increase in downstream pressure, a lower speed will provide the balanced position of the core 46 and hence the alternator will have its throttle closed until such reduced speed is achieved. The scheduled droop control provides a control which is substantially torque responsive. It has been found that the downstream pressure at the turbine inlet is, as above noted, substantially proportionate to the load on the alternator, and, hence, as the load on the alternator increases a proportionate force is applied against the piston 62 in aid of the flyballs 55. This means that as the load on the alternator increases, the speed of the alternator will be slightly decreased in substantially a constant ratio to the load increase. This control is utilized in combination with similar control, on all of the alternators so that the load on the system will be assumed equally by the individual alternators.

In starting an alternator into operation, assuming that it is desired to initiate operation of the individual alternator 10 from a standstill position, the manual or otherwise directly controlled throttle plate 72 is opened. Upon the opening of this throttle, a pressure $P_1$ will be applied to the conduit 25 and a somewhat lower pressure $P_2$ will be applied to the conduit 33 on the downstream side of the throttle plate 12. Since at the starting condition, element 37 will be at its furthest right hand position, the torque applied by the lever 15 and spring 16 will easily overpower the piston 21 and the chamber 22 will be connected to the pressure $P_1$. Thus, the pressure $P_2$ in the conduit 25 will be applied to the chamber 28 and since the pressure upstream of the throttle plate 12 is greater than that downstream of it, the throttle plate 12 will be opened. The opening of the throttle plate 12 will, of course, cause the turbine 11 to begin driving the alternator 10 at an increasingly greater speed.

Under the above outlined circumstances, the speed of the alternator 10 will increase until a predetermined balanced condition is reached. As the speed increases, it will come within the speed range of the remaining alternators and the alternator may be synchronized with the remaining alternators.

In order that substantially identical speed versus load droop characteristics will be had in all of the alternators, an adjustment is provided at each alternator. This adjustment permits the effect of pressure on the piston 62 of the valve core 46 in response to a change in $P_2$ to be modified, and the effect of the speed governor 53 likewise to be changed.

As shown in the figure a load trim servomotor 65 is connected to an adjustable stop 68 by means of gears 66.

A spring 60 is positioned between piston 62 and stop 68 and acts in opposition to spring 57 to balance that spring. By adjusting the positions of stop 68, the no-load speed of the alternator will be changed, and the slope of the speed versus load curve will be adjusted to cause the individual alternator to assume its share of the load at the speed of synchronism.

The load trim servomotor 65 is preferably actuated by a servo generator located at a control station 70 along with similar controls for the remaining alternators. A speed sensing unit 71 is also provided at the control station to aid in the initial synchronization of the alternator with the remaining alternators.

The control station may also, if desired, be provided with an automatic safety control for the separate actuation of the cut off valve 72 in response to disablement of the individual alternator 10. This emergency shut off valve is preferably electrically controlled by solenoid 73 which actuates a pilot valve 74 to control a pneumatic actuator 75. The safety valve 72, may, of course, alternatively, be manually operated mechanically.

It will be understood that while auxiliary control is essential to the overall system since aircraft are subject to possible partial disablement, the exact construction of the safety control for the throttle 72 is not vital to the operativeness of the system. Thus, it will be understood that various types of safety control valves may be utilized and that the alternator control system herein disclosed is not limited to the use of the pneumatic arrangement shown in the Figure 1.

A modified form of the present control system is illustrated in Figure 2. As in the case of the structure shown in Figure 1, the control apparatus of Figure 2 provides a control of the turbine throttle 12a in direct accordance with the torque load on the individual alternator. However, in order to more accurately relate the speed-load "droop" characteristic to the exact load imposed on the alternator, the control system shown in Figure 2 provides a direct control of the droop from a mechanical torque responsive valve rather than from the somewhat less accurate turbine inlet pressure $P_2$.

As shown in Figure 2, an alternator 10a is driven by means of the turbine 11a having a throttle 12a. The alternator 10a supplies electricity for uses on aircraft or the like through the conductors 14a and is provided with a torque lever 15a preferably rigidly secured to the outer housing of the alternator. Contrary to the arrangement shown in Figure 1, the lever 15a is mounted for movement in the same direction as the alternator drive turbine and hence the use of planetary gearing or other means for providing a reversal of torque at the lever 15 is not required. This elimination of the reversing mechanism, and the torque lever arm modifying arrangement shown in the form of elements 35 and 37 in Figure 1 materially simplifies the embodiment shown in Figure 2.

As may be seen, the torque responsive valve 20a is provided with a valve core 23a the position of which is controlled by the movable piston 21a. Upon an increase in torque on the alternator 10a, the lever 15a is moved in the clockwise direction as viewed in Figure 2 thereby moving the valve core 23a upwardly to apply pressure $P_1$ through the conduit 25a to the conduit 27a and the chamber 28a in the throttle actuator 29a. This application of the line pressure $P_1$ to the chamber 28a urges the actuator piston 30a upwardly to open the throttle 12a to provide more motive fluid to the turbine, thereby causing the alternator to maintain its speed at its proper load rather than operate as a motor drawing current from the other alternators. As in the case of the system illustrated in Figure 1, feed back is provided for the system in the form of the application of the pressure $P_2$ to the chamber 31a by means of the conduit 32a. Thus as the throttle plate 12a opens the pressure $P_2$ will increase, tending to balance the piston 30a.

As in the case of the modification shown in Figure 1, the structure in Figure 2 provides speed control of the throttle as well as load control. However, the speed control is directly applied rather than comprising an indirect control operating through the adjustment of the torque lever as shown in Figure 1. Instead the structure shown in Figure 2 utilizes a control valve 80 for controlling the application of pressure $P_1$ to the chamber 81 of the throttle actuator 29a to urge the piston 82 upwardly to open the throttle 12a in response to a decrease in speed.

The valve 80 comprises a housing 83 having a bearing 84 therein supporting a slidable valve core 85. The left end of the core 85 is provided with a valve seat 86 leading to atmosphere through the conduit 87 and closed by the reciprocating valve 88. The valve 88 is urged toward the right into seating engagement with the valve seat 89 and engagement with the valve seat 86 by means of a spring 90. The valve core 85 is urged toward the left by means of the centrifugal governor spring 91 and is oppositely urged, toward the right, by means of the flyweights 92 that are positively driven by means of a shaft 54b in driving connection with the alternator output shaft.

As above described, the control valve 80 will operate upon an increase in alternator speed above a predetermined set speed, to move the valve core 85 toward the right, venting chamber 93 to atmosphere through the conduit 87 and thus venting the chamber 81, causing the throttle plate 12a to become unbalanced toward the closing position. Conversely, upon a drop in speed below the desired operating speed, ordinarily resulting from the sudden imposition of additional load on the alternator, the spring 91 will urge the valve core 85 to the left opening the chamber 93 to the conduit 50a and thereby applying the pressure $P_1$ to the chamber 81, opening the throttle 12a.

In order to prevent undue fluctuation a delay is provided in the movement of the core 85 by means of an integration rate chamber 94 which is connected to the chamber 83 by means of the conduit 95 having a restriction 96 therein. The restriction 96 prevents extremely rapid equalization of pressures between the chambers 93 and 94, thereby permitting only a relatively gradual movement of the valve core 85 in either direction.

The scheduled "droop" is provided in the system shown in Figure 2 by means of a scheduled droop chamber 97 which is connected by a conduit 98 having a restriction 99, to the conduit 27a under the control of the torque responsive valve 20a. It will be apparent that upon an increase in torque, or load on the alternator 10a, an increase in pressure will occur in the conduit 27a as explained above. This increase of pressure will, after a delay imposed by the restriction 99, appear in part in the chamber 97, tending to urge the valve core 85 toward the right. Since movement of the valve core 85 toward the right is also simultaneously urged by the flyweights 92, it will be apparent that application of pressure to the chamber 97 will cause the valve core 85 to move toward the right to open the throttle at a lower speed than the speed necessary when no pressure is applied to the chamber 97. This in effect causes the system to operate at a lower speed, thereby providing droop in a manner similar to that provided in the modification shown in Figure 1. However, in view of the direct control of the droop by the torque lever 15a and the valve 20a, rather than control through the less accurate medium of the pressure $P_2$, a more accurate droop control is provided.

It will thus be apparent that I have provided a novel and highly efficient control for an electrical power source comprising a plurality of similar alternators connected in parallel to supply the electrical energy necessary to carry a varying load. It will readily be seen that when the control system is adjusted it will cause each alternator to carry its share of the load and also to maintain a predetermined speed which varies in a predetermined uniform manner with load. Thus, all of the alternators will operate in synchronism on substantially identical speed-load curves to provide an evenly divided, efficient generation of power without danger of an overload being applied on one or more of the individual alternators.

It will be understood, of course, that further modifications and variations may be made in the above disclosed control apparatus without departing from the scope of the novel concepts of the present invention and it is therefore intended that the invention be limited solely by the scope of the appended claims.

I claim as my invention:

1. An actuating system for the throttle of a gas turbine driving one of a plurality of alternators, comprising a throttle actuating piston, means applying pressure upstream of said throttle to the side of said piston urging said throttle into the open position, second means applying pressure downstream of said throttle to the opposite side of said piston, third means controlling the first means to vary the pressure against said one side of the piston from atmospheric pressure to said upstream pressure, said third means comprising a cylinder having a piston therein, said cylinder and piston having aligned apertures one of which leads to the atmosphere and the other of which leads to a conduit having said upstream pressure, a floating valve for closing said one aperture and simultaneously opening said other aperture when said piston is moved toward said other aperture, and means for moving said piston toward said other aperture in response to an increase in load on said turbine, or a decrease in turbine speed, or a combination thereof.

2. A control for an alternator connected to an electrical load in parallel with other similar alternators comprising, an actuator for the source of power driving said alternator, first means urging said actuator to disconnect said source, second means urging said actuator to apply a greater percentage of the energy of said source and normally having a value greater than the value of said first means, third means controlling said second means to vary the value thereof above and below that of said first means, said third means comprising a valve adapted to increase the value of said second means upon an increase in load on said alternator or upon a decrease in speed of said alternator, fourth means for sensing the load on said one alternator, fifth means for sensing the speed of said alternator and for relaying it to said third means, and sixth means associated with said fifth means for modifying said fifth means in response to changes in the load on said alternator.

3. A control for an alternator connected to an electrical load in parallel with other similar alternators comprising, an actuator for the source of power driving said alternator, first means urging said actuator to disconnect said source, second means urging said actuator to apply a greater percentage of the energy of said source and normally having a value greater than the value of said first means, third means controlling said second means to vary the value thereof above and below that of said first means, said third means comprising a valve adapted to increase the value of said second means upon an increase in load on said alternator or upon a decrease in speed of said alternator, fourth means for sensing the load on said one alternator, fifth means for sensing the speed of said alternator and for relaying it to said third means, sixth means associated with said fifth means for modifying said fifth means in response to changes in the load on said alternator, and seventh means associated with said fifth and sixth means for adjusting said fifth means and the effect of said sixth means thereon.

4. A control for an alternator connected in parallel with a plurality of other similar alternators, comprising, a throttle actuator for said alternator, a first pivoted lever, a second lever associated with said alternator to pivot about a point remote from the pivot of said first pivoted lever in response to the torque on said alternator, a member positioned between said first and second levers between the pivots thereof for transmitting force between said levers in response to variations in the torque on said alternator and means for moving said member, said means comprising an actuator actuatable in response to the speed of said alternator and the inlet pressure thereto, said actuator for said throttle being controlled by the position of said first pivoted lever to open said throttle when the torque on said alternator increases and to close said throttle when the speed of said alternator increases beyond a predetermined point determined by said load.

5. A control for an alternator connected to an electrical load in parallel with other similar alternators comprising, an actuator for the source of power driving said alternator, first means urging said actuator to disconnect said source, second means urging said actuator to apply a greater percentage of the energy of said source and normally having a value greater than the value of said first means, third means controlling said second means to vary the value thereof above and below that of said first means, said third means comprising a valve adapted to increase the value of said second means upon an increase in load on said alternator or upon a decrease in speed of said alternator, fourth means for sensing the load on said one alternator, fifth means for sensing the speed of said alternator and for relaying it to said third means, and sixth means associated with said fifth means for modifying said fifth means in response to changes in the level of energy from said source downstream of said actuator.

6. A control for an alternator connected in parallel with a plurality of other similar alternators, comprising, a throttle actuator for said alternator, a first pivoted lever, a second lever associated with said alternator to pivot about a point remote from the pivot of said first pivoted lever in response to the torque on said alternator, a member positioned between said first and second levers between the pivots thereof for transmitting force between said levers in response to variations in the torque on said alternator and means for moving said member, said means comprising an actuator actuatable in response to the speed of said alternator and the inlet pressure thereto, said actuator for said throttle being controlled by the position of said first pivoted lever to open said throttle when the torque on said alternator increases and to close said throttle when the speed of said alternator increases beyond a predetermined point manually adjusted and modified in accordance with said inlet pressure to assume a decreased value upon increase in load.

7. An alternator control comprising means for modifying the source of compressed fluid driving a turbine connected to said alternator said means including, a throttle for varying the inlet pressure to said turbine, second means connecting the pressure upstream of said throttle to said throttle to urge said throttle open, third means connecting the inlet pressure downstream of said throttle to said throttle, fourth means connected to said second means and adapted to control said second means to vary the effect of said second means on said throttle, and fifth means responsive to the torque delivered by said turbine for controlling said fourth means to open said throttle on an increase in torque.

8. An alternator control comprising means for modifying the source of compressed fluid driving a turbine connected to said alternator, said means including, a throttle for varying the inlet pressure to said turbine, second means connecting the pressure upstream of said throttle to said throttle to urge said throttle open, third means connecting the inlet pressure downstream of said throttle to said throttle, fourth means connected to said second means and adapted to control said second means to vary the effect of said second means on said throttle, fifth means responsive to the torque delivered by said turbine for controlling said fourth means to open said throttle on an increase in torque, and sixth means for modifying the effect of said torque on said fifth means in response to changes in the speed of said turbine.

9. An alternator control comprising means for modifying the source of compressed fluid driving a turbine connected to said alternator, said means including, a throttle for varying the inlet pressure to said turbine, second means connecting the pressure upstream of said throttle to said throttle to urge said throttle open, third means connecting the inlet pressure downstream of said throttle to said throttle, fourth means connected to said second means and adapted to control said second means to vary the effect of said second means on said throttle, fifth means responsive to the torque delivered by said turbine for controlling said fourth means to open said throttle on an increase in torque, and sixth means for modifying the effect of said torque on said fifth means in response to changes in the speed of said turbine and the load on said turbine.

10. An alternator control comprising means for modifying the source of compressed fluid driving a turbine connected to said alternator, said means including, a throttle for varying the inlet pressure to said turbine, second means connecting the pressure upstream of said throttle to said throttle to urge said throttle open, third means connecting the inlet pressure downstream of said throttle to said throttle, fourth means connected to said second means and adapted to control said second means to vary the effect of said second means on said throttle, fifth means responsive to the torque delivered by said turbine for controlling said fourth means to open said throttle on an increase in torque, and sixth means for modifying the effect of said torque on said fifth means in response to changes in the speed of said turbine and the load on said turbine as reflected in said inlet pressure.

11. A control for a turbine driving an alternator comprising, a throttle for said turbine, first means actuating said throttle in the opening direction in response to an increase in load on said turbine, said first means including a lever actuating a valve, second means interposed between said lever and said valve for transmitting actuation force from said lever to said valve, and third means for modifying the position of said second means to vary the ratio of actuating force transmission between said lever and said valve in response to changes in turbine speed.

12. A control for a turbine driving an alternator comprising, a throttle for said turbine, first means actuating said throttle in the opening direction in response to an increase in load on said turbine, said first means including a lever actuating a valve, second means interposed between said lever and said valve, and third means for modifying the position of said second means to vary the effect of said movements of said lever on said valve in response to changes in turbine speed and turbine inlet pressure downstream of said throttle.

13. An alternator control comprising means for modifying the source of compressed fluid driving a turbine connected to said alternator, said means including a throttle for varying the inlet pressure to said turbine, second means connecting the pressure upstream of said throttle to said throttle to urge said throttle open, third means connecting the inlet pressure downstream of said throttle to said throttle to urge said throttle closed, fourth means connected to said second means and adapted to control said second means to vary the effect of said second means on said throttle, fifth means responsive to the torque delivered by said turbine for controlling said fourth means to open said throttle on an increase in torque, sixth means associated with said throttle for urging said throttle open in response to a decrease in alternator speed, and seventh means connected to said sixth means for causing a modification of the effect of said speed control with a variation in alternator load.

14. An alternator control comprising means for modifying the source of compressed fluid driving a turbine connected to said alternator, said means including a throttle for varying the inlet pressure to said turbine, second means connecting the pressure upstream of said throttle to said throttle to urge said throttle open, third means connecting the inlet pressure downstream of said throttle to said throttle to urge said throttle closed, fourth means connected to said second means and adapted to control said second means to vary the effect of said second means on said throttle, fifth means responsive to the load on said turbine for controlling said fourth means to open said throttle on an increase in load on said turbine, and sixth means responsive to the speed of said alternator to open said throttle upon a decrease in speed.

15. A control for an alternator connected to an electrical load in parallel with other similar alternators comprising, an actuator for the source of power driving said alternator, first means urging said actuator to disconnect said source, second means urging said actuator to apply a greater percentage of the energy of said source and normally having a value greater than the value of said first means, third means controlling said second means to vary the value thereof above and below that of said first means, said third means comprising a valve adapted to increase the value of said second means upon an increase in load on said alternator, fourth means controlling said second means to increase the value of said second means upon a decrease in alternator speed, fifth means for sensing the load on said one alternator for controlling said third means, sixth means for sensing the speed of said alternator and for controlling said fourth means, and seventh means associated with said sixth means for modifying said sixth means in response to changes in the load on said alternator to cause said alternator to run at a decreasing speed with increasing load.

References Cited in the file of this patent

UNITED STATES PATENTS

| | | |
|---|---|---|
| 459,545 | Freeman | Sept. 15, 1891 |
| 661,222 | Mershon | Nov. 6, 1900 |
| 1,675,477 | Wilson | July 3, 1928 |
| 2,113,416 | Warren | Apr. 5, 1938 |
| 2,294,753 | Hedman | Sept. 1, 1942 |